3,121,637
BREAKFAST CEREAL PROCESS
Adolph S. Clausi, Battle Creek, Mich., Willard L. Vollink, Bourbonnais, Ill., and Elmer W. Michael, Battle Creek, Mich., assignors to General Foods Corporation, White Plains, N.Y., a corporation of Delaware
No Drawing. Filed Aug. 29, 1960, Ser. No. 52,375
12 Claims. (Cl. 99—80)

This invention relates to a new and improved process for the production of ready-to-eat breakfast cereals. More particularly, the invention relates to a method of preparing cooked doughs from cereal flours and like starch-containing materials for the production of ready-to-eat breakfast cereal products either in the form of a puffed piece or a toasted flake.

In the production of ready-to-eat breakfast cereals it is generally required that the starch-containing material be prepared in the form of a moist dough, say of 30–40% moisture, which is eventually cooked to gelatinize the starch in the dough and transform it into a tenacious pliable mass capable of further handling. In such later handling the cooked dough mass is extruded and subdivided into dough pieces which may be shaped and eventually gun-puffed or which may be flaked and eventually oven toasted to produce a desirable blistered crisp product.

In the production of breakfast cereal products by either of these two alternatives, it is important that the cereal dough be cooked to a uniform degree for efficiency flaking. To explain, in the present commercial process for making breakfast cereals in flake form a number of processing steps are involved which call for considerable capital investment and operating expense. Generally, the material of cereal grains either in grit or dough form is cooked at a moisture level ranging upward from 30% for 60–150 minutes in the presence of various flavoring materials, the longer cooking periods being required in the case of grits. Cooking is customarily carried out by steaming the ingredients in a pressure cooker where the materials can be gelatinized under pressures ranging from 15 to 30 p.s.i.g. Such long cooking times at the elevated temperatures employed are required since the products being cooked were natural grains, parts of grains, or non-homogeneous agglomerates of non-uniform size. For example, cereal flakes produced from corn require 150 minutes of cooking at 17 p.s.i.g. and bran flakes (wheat flour and broken wheat particles) require 60 minutes of cooking at 15 p.s.i.g. The cooked material at the aforesaid high moisture level must then be dried to about 20% mosture and tempered for an additional extended period, say at least one hour, and ranging up from four to eight hours for larger particles such as corn grits. This moisture reduction and tempering is for the purpose of permitting the mass of grains or dough pieces to be flaked. Unless such drying is practiced the grain or dough pieces will adhere to the flaking roll or its doctor blade making it impossible to get a clean, distinct flake for later toasting. Moreover, in the eventual flake the degree of cooking can vary such that the quality of the toasted flake itself will vary from the desirable crisp blistered goods to a dense, lifeless product.

It is an object of the present invention to provide in the art of producing ready-to-eat breakfast cereal products a process which is relatively simple and inexpensive and which permits the starch-containing material to be processed in a more uniform and controllable manner for uniform product quality. It is also an object of the present invention to produce dough pieces which produce a uniformly high yield of flaked product. The method should be of a type which does not introduce handling difficulties such as those outlined hereinabove for the flaking of dough pieces or cooked grains to produce flaked products. It is a further object of the present invention to have a process calling for shorter and less severe cooking procedures whereby more of the material nutrition is retained in the cooked piece, and savings can be practiced in terms of the time and temperatures required to produce a properly cooked dough for subsequent treatment.

It has now been discovered that the objects of the present invention may be met by gelatinizing hydrated, ungelatinized cereal dough pieces having a moisture content of 22–36% at a temperature of 215° F. to 250° F. at the autogenous steam pressure, i.e., 1 to 15 p.s.i.g., cooling the gelatinized cereal dough pieces to below 150° F., partially drying the gelatinized cereal dough pieces to 5% to 21% moisture, pelletizing the cereal dough pieces before partially drying, mechanically modifying the shape of the dough pieces, and drying the cereal dough pieces to a moisture content of 1 to 3.5% moisture under conditions such that the temperature of the cereal dough pieces does not exceed 250° F.

As used in the present invention, the term "cereal dough pieces" refers to the pieces which result when cereal flours are treated with sufficient moisture to form agglomerates of such flours upon mixing of the flour and moisture. The term "pelletizing" refers to the extrusion of the cereal dough through a conventional, commercial, pelletizing machine to form pellets. The term "mechanically modifying" refers to the process whereby the dough pieces pass between flaking rolls to produce cereal flakes, are vacuum puffed, or are treated by other cereal finishing processes at temperatures which will not raise the cereal piece temperature to above 250° F.

The process of the present invention can be accomplished by agglomerating cereal flour or a blend of cereal flours, preferably cereal flours of a high protein content, with sufficient moisture to provide a final moisture content of 22–36% until the mass of dough pieces which form is homogeneously blended. The mass of dough pieces may then be cooked or it may first be pelletized and then cooked. The moisture content of the cereal mass should not exceed 36% moisture immediately prior to agglomeration to form dough pieces nor should it be less than 22% moisture. At moisture contents greater than 36%, the cereal mass does not agglomerate properly to form the dough pieces. At moisture contents below 22% insufficient moisture is present for adequate gelatinization to take place during cooking. While it is preferred to cook the cereal flours after they have been blended, it is possible to cook the flours separately and blend them after cooking.

When the hydrated dough pieces having a moisture content of 22–36% are cooked before being pelletized, the product is cooked at the moisture content of the agglomerated mass, that is, 22–36%. Preferably, the dough pieces should have a moisture content of 26–30% when steam is directly contacted with the mass. Where the product is cooked by indirect heating, such as by applying heat to a jacketed wall, the preferred moisture content is 30–32%. The product is cooked at a temperature of 215° F. to 250° F. at the autogenous pressure of steam (1 to 15 p.s.i.g.) and preferably at a temperature of 227° F. to 250° F. (5 to 15 p.s.i.g.). At temperatures below 215° F. insufficient cooking takes place during the cooking period and at temperatures above 250° F. an undesirable strong bitter flavor starts to develop.

The product is cooked for 5 to 20 minutes, the longer period of time being employed where lower cooking temperatures are used and the shorter period of time where higher temperatures are used. While the cereal flours usually agglomerate in the mixer to form the dough pieces, it is not essential that they do so provided that agglomeration takes place in such case in the cooking step.

Where the cooked, non-pelletized mass leaving the cooker is non-homogeneous in particle size, it is preferable to pass the cooked mass through a lump breaker to provide a mass having a homogeneous particle size.

The cooked mass is cooled to a temperature below 150° F., preferably 120–150° F. in the case of the unpelletized cooked cereal mass and a temperature of 90–100° F. in the case of the cooked pellets. If the cooked mass is not cooled to a temperature below 150° F., excessive condensation develops with a resultant stickiness of the product which presents difficulties in subsequent processing. It is desired to employ a temperature of 90–100° F. when handling pellets for ease of handling only. The unpelletized, cooled, cooked mass may then be pelletized by any conventional pelletizing machine.

As an alternative, the agglomerated, uncooked cereal may be pelletized in a conventional commercial pelletizing machine and then cooked at a temperature of 227–250° F. for 5 to 20 minutes.

As before, the moisture content of the pellets during cooking should be in the range of 26–32%, preferably 26–29% where the pellets are directly contacted with steam and 30–32% where the pellets are heated indirectly.

The pellets of cereal flour which were cooked either before or after pelletizing are then partially dried to a moisture content of 5 to 21%, preferably 15 to 21% where the pellets are to be used to prepare flakes or shreds or 5 to 15% where the pellets are to be puffed at low temperatures under reduced atmospheric pressure.

The partially dried pellets are then mechanically modified by any conventional cereal finishing technique such as flaking through rolls, shredding, or puffing at temperatures which will not raise the cereal temperature to above 250° F. The treated or mechanically modified cereal is then dried to a moisture content of 1 to 3½% moisture at an air temperature of 250° to 350° F., the product temperature at no time exceeding 250° F. In the case of certain types of cereal products, higher drying temperatures may be employed provided the protein and carbohydrate content of the cereal product is not degraded by such processing.

While the present invention produces the desired results with all cereal flours, eminently satisfactory results have been obtained with cereal flours containing a major portion of oat flour. Such flours are highly nutritious and in such cases it is desired to keep the nutritional loss which occurs during processing to a minimum.

The invention will now be more fully described by reference to the accompanying examples.

EXAMPLE 1

*Oat Flakes*

| Ingredients: | Parts by weight percent |
|---|---|
| Oat flour | 60–70 |
| Rice flour | 7–12 |
| Soy flour | 5–10 |
| Sucrose | 5–15 |
| Lecithin | 0.05–0.15 |
| Salt | 2–4 |
| Milk protein | 1.5–3.5 |

*Process.*—The dry ingredients were homogeneously blended and sufficient moisture was added to form a mixture having a moisture content of 27–29%. The mass was blended until all of the dry material had formed agglomerates. The agglomerates were then introduced into a jacketed cooking vessel having agitating means. The mass was cooked and agitated at a temperature of 227° F. and a pressure of 5 p.s.i.g. for 15 minutes. At the end of such time, the farinaceous materials were thoroughly gelatinized and the agglomerates were removed from the cooker and passed through a lump breaker to form particles having a uniform size. The particles were cooled to a temperature of 140° F., passed through a "Welding Engineers" or a "Buhler" type pelletizing machine to produce discrete dough pieces or pellets having a diameter of about $\frac{3}{16}''$ and a length of about ½". The pellets were dried to 20% moisture on a travelling screen drier which had circulating air at a temperature ranging from 250° F. to 350° F. passing over and around the pellets. The dried pellets were introduced to flaking rolls having a spacing of 0.01–0.05" to produce the cereal flakes. The flakes were dried to a moisture content of 1–3½% by use of a moving screen drier having an air temperature of 250–350° F. At no time did the temperature of the product exceed 250° F.

The product obtained was an untoasted, highly nutritious cereal flake having excellent flavor and texture.

EXAMPLE 2

*Corn Flakes*

| Ingredients: | Parts by weight percent |
|---|---|
| Corn flour | 70–80 |
| Soy flour | 5–10 |
| Sucrose | 5–15 |
| Lecithin | 0.05–0.15 |
| Salt | 2–4 |
| Milk protein | 1.5–3.5 |

*Process.*—The dry ingredients were homogeneously blended and sufficient moisture was added to form a mixture having a moisture content of 27–29%. The mass was blended until all of the dry material had formed agglomerates. The agglomerates were then introduced into a jacketed cooking vessel having agitating means. The mass was cooked and agitated at a temperature of 227° F. and a pressure of 5 p.s.i.g. for 15 minutes. At the end of such time, the farinaceous materials were thoroughly gelatinized and the agglomerates were removed from the cooker and passed through a lump breaker to form particles having a uniform size. The particles were cooled to a temperature of 140° F., passed through a "Welding Engineers" or a "Buhler" type pelletizing machine to produce discrete dough pieces or pellets having a diameter of about $\frac{3}{16}''$ and a length of about ½". The pellets were dried to 20% moisture on a travelling screen drier which had circulating air at a temperature ranging from 250° F. to 350° F. passing over and around the pellets. The dried pellets were introduced to flaking rolls having a spacing of 0.01–0.05" to produce the cereal flakes. The flakes were dried to a moisture content of 1–3½% by use of a moving screen drier having an air temperature of 250–350° F. At no time did the temperature of the product exceed 250° F.

The product obtained was an untoasted, highly nutritious cereal flake having excellent flavor and texture.

Nutritionally, oat flakes prepared according to the present invention are far superior to conventional commercial cereal flakes such as those prepared from corn, wheat, or bran. In studies with rats, the average growth for 28 days in the case of oat flakes such as those set forth in Example 1 resulted in a rat growth of 140–147 grams whereas rats maintained on cereal flakes other than oat flakes showed no gain. In addition to the cereal flakes, the rats were given a complete vitamin and mineral supplement. The results of such a study clearly demonstrate the nutritional superiority of oat flakes as compared to conventional commercial flake cereals.

While the oat flakes prepared according to the present invention are eminently satisfactory as a cold breakfast cereal, it was unexpected to find that the flakes also produce a highly satisfactory hot oat cereal when hot water is added to them. Conventional cold breakfast cereals are totally unsuited for such purpose, forming an unpalatable dough mush in hot water. The oat flakes of the present invention present a pleasing and novel texture and flavor to the consumer of hot cereals.

The present invention is a continuation-in-part of Serial No. 832,447, filed August 10, 1959, now abandoned.

While the preceding examples illustrate several embodiments of the present invention, reference should be had to the appended claims for a definition of the scope of the invention.

What is claimed is:

1. A process for preparing a breakfast cereal product suitable for use as a hot and cold cereal which has retained substantially all of its pre-processing nutritive value which comprises gelatinizing hydrated, ungelatinized dough pieces having a moisture content of 22% to 36% moisture at a temperature of 215° F. to 250° F. at a pressure of 1 to 15 p.s.i.g., cooling the gelatinized dough pieces to below 150° F., partially drying the gelatinized dough pieces to 5% to 21% moisture, pelletizing the dough pieces before partially drying, mechanically modifying the dough pieces and drying the dough pieces to a moisture content of 1% to 3.5% moisture under conditions such that the temperature of the dough pieces does not exceed 250° F.

2. The process according to claim 1 wherein the dough pieces are pelletized before gelatinization.

3. The process according to claim 1 wherein the dough pieces are pelletized after gelatinization.

4. A process for preparing a breakfast cereal product suitable for use as a hot and cold cereal which has retained substantially all of its pre-processing nutritive value which comprises gelatinizing hydrated, ungelatinized dough pieces having a moisture content of 26% to 29% moisture at a temperature of 215° F. to 250° F. at a pressure of 1 to 15 p.s.i.g. by direct contact with steam, cooling the gelatinized dough pieces to 120° F. to 150° F., pelletizing the dough pieces, partially drying the pellets to 15% to 21% moisture, flaking the pellets and drying the flakes to a moisture content of 1% to 3.5% moisture under conditions such that the temperature of the flakes does not exceed 250° F.

5. A process for preparing a breakfast cereal product suitable for use as a hot and cold cereal which has retained substantially all of its pre-processing nutritive value which comprises gelatinizing hydrated, ungelatinized dough pieces having a moisture content of 30% to 32% moisture at a temperature of 215° F. to 250° F. at a pressure of 1 to 15 p.s.i.g., cooling the gelatinized dough pieces to 120° F.–150° F., pelletizing the dough pieces, partially drying the pellets to 15% to 21% moisture, flaking the pellets and drying the flakes to a moisture content of 1% to 3.5% moisture under conditions such that the temperature of the flakes does not exceed 250° F.

6. A process for preparing a breakfast cereal product suitable for use as a hot and cold cereal which has retained substantially all of its pre-processing nutritive value which comprises gelatinizing hydrated, ungelatinized dough pieces having a moisture content of 26% to 29% moisture at a temperature of 215° F. to 250° F. at a pressure of 1 to 15 p.s.i.g. by direct contact with steam, cooling the gelatinized dough pieces to 120° F.–150° F., pelletizing the dough pieces, partially drying the pellets to 5% to 15% moisture, vacuum puffing the pellets and drying the puffed pellets to a moisture content of 1% to 3.5% moisture under conditions such that the temperature of the puffed pellets does not exceed 250° F.

7. A process for preparing a breakfast cereal product suitable for use as a hot and cold cereal which has retained substantially all of its pre-processing nutritive value which comprises gelatinizing hydrated, ungelatinized dough pieces having a moisture content of 30% to 32% moisture at a temperature of 215° F. to 250° F. at a pressure of 1 to 15 p.s.i.g., cooling the gelatinized dough pieces to 120° F.–150° F., pelletizing the dough pieces, partially drying the pellets to 5% to 15% moisture, vacuum puffing the pellets and drying the puffed pellets to a moisture content of 1% to 3.5% moisture under conditions such that the temperature of the puffed pellets does not exceed 250° F.

8. A process for preparing a breakfast cereal product suitable for use as a hot and cold cereal which has retained substantially all of its pre-processing nutritive value which comprises hydrating ungelatinized cereal flours to a moisture content of 26% to 29%, mixing and agglomerating said hydrated mixture to form dough pieces, pelletizing said dough pieces, gelatinizing said pellets at a temperature of 215° F. to 250° F. and a pressure of 1 to 15 p.s.i.g. by direct contact with steam, cooling said pellets to 90° to 100° F., partially drying said pellets to 15%–21% moisture, flaking the pellets and drying the flakes to a moisture content of 1% to 3.5% under conditions such that the temperature of the flakes does not exceed 250° F.

9. A process for preparing a breakfast cereal product suitable for use as a hot and cold cereal which has retained substantially all of its pre-processing nutritive value which comprises hydrating ungelatinized cereal flours to a moisture content of 30% to 32%, mixing and agglomerating said hydrated mixture to form dough pieces, pelletizing said dough pieces, gelatinizing said pellets at a temperature of 215° F. to 250° F. at a pressure of 1 to 15 p.s.i.g., cooling said pellets to 90°–100° F., partially drying the pellets to 15% to 21% moisture, flaking the pellets and drying the flakes to a moisture content of 1% to 3.5% moisture under conditions such that the temperature of the flakes does not exceed 250° F.

10. A process for preparing a breakfast cereal product suitable for use as a hot and cold cereal which has retained substantially all of its pre-processing nutritive value which comprises hydrating ungelatinized cereal flours to a moisture content of 26% to 29%, mixing and agglomerating said hydrated mixture to form dough pieces, pelletizing said dough pieces, gelatinizing said pellets at a temperature of 215° F. to 250° F. and a pressure of 1 to 15 p.s.i.g. by direct contact with steam, cooling said pellets to 90° to 100° F., partially drying said pellets to 5%–15% moisture, vacuum puffing the pellets and drying the puffed pellets to a moisture contents of 1% to 3.5% under conditions such that the temperature of the puffed pellets does not exceed 250° F.

11. A process for preparing a breakfast cereal product suitable for use as a hot and cold cereal which has retained substantially all of its pre-processing nutritive value which comprises hydrating ungelatinized cereal flours to a moisture content of 30% to 32%, mixing and agglomerating said hydrated mixture to form dough pieces, pelletizing said dough pieces, gelatinizing said pellets at a temperature of 215° F. to 250° F. at a pressure of 1 to 15 p.s.i.g., cooling said pellets to 90°–100° F., partially drying the pellets to 5% to 15% moisture, vacuum puffing the pellets and drying the puffed pellets to a moisture content of 1% to 3.5% moisture under conditions such that the temperature of the puffed pellets does not exceed 250° F.

12. The process according to claim 11 wherein drying is carried out employing air at a temperature of 250°–350° F.

References Cited in the file of this patent

UNITED STATES PATENTS

| | | |
|---|---|---|
| 1,890,697 | Scanlon | Dec. 13, 1932 |
| 1,925,267 | McKay | Sept. 5, 1933 |
| 2,954,296 | Clausi | Sept. 27, 1960 |